(12) United States Patent
Bito

(10) Patent No.: US 7,798,521 B2
(45) Date of Patent: Sep. 21, 2010

(54) LOWER LIMB PROTECTING AIRBAG APPARATUS

(75) Inventor: Kazuaki Bito, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 271 days.

(21) Appl. No.: 11/902,380

(22) Filed: Sep. 21, 2007

(65) Prior Publication Data

US 2008/0079245 A1    Apr. 3, 2008

(30) Foreign Application Priority Data

Oct. 2, 2006    (JP)    ............... 2006-270670

(51) Int. Cl.
*B60R 21/16* (2006.01)
(52) U.S. Cl. .................................. 280/730.1
(58) Field of Classification Search ............. 280/728.2, 280/30.1, 743.1, 751–753.7, 730.1
See application file for complete search history.

(56) References Cited

U.S. PATENT DOCUMENTS

| 4,951,963 | A | * | 8/1990 | Behr et al. | ................ 280/753 |
|---|---|---|---|---|---|
| 5,344,184 | A | * | 9/1994 | Keeler et al. | ............. 280/730.1 |
| 6,357,785 | B1 | * | 3/2002 | Heilig | ..................... 280/728.2 |
| 6,959,944 | B2 | * | 11/2005 | Mori et al. | ................ 280/728.2 |
| 7,204,511 | B2 | | 4/2007 | Mori et al. | |
| 7,234,727 | B2 | | 6/2007 | Mori et al. | |
| 7,494,152 | B2 | * | 2/2009 | Schuler et al. | ............. 280/752 |
| 2005/0062264 | A1 | * | 3/2005 | Arwood et al. | ........... 280/730.1 |

FOREIGN PATENT DOCUMENTS

JP    A-2004-352037    12/2004

* cited by examiner

*Primary Examiner*—Paul N Dickson
*Assistant Examiner*—Robert A Coker
(74) *Attorney, Agent, or Firm*—Posz Law Group, PLC

(57) ABSTRACT

A lower limb protecting airbag apparatus M1 is provided in front of the lower limbs L of an occupant D seated in a seat. At the collision of vehicles, the lower limb protecting airbag apparatus is operated to be able to protect the lower limbs of the occupant so that an airbag having inflated in front of the lower limbs is disposed therein. An accommodating part configured to accommodate and hold the airbag is supported by a support arm. A servo motor is activated to cause the support arm to feed the accommodating part from a standby position to a working position at which the airbag is expanded and inflated. The accommodating part has a support portion which can support a front surface side when the airbag having completed inflation at the working position catches the lower limbs.

2 Claims, 11 Drawing Sheets

LOWER LIMB PROTECTING AIRBAG APPARATUS

BACKGROUND OF THE INVENTION

1. Field of the Invention

The present invention relates to a lower limb protecting airbag apparatus which is provided in front of the lower limbs of an occupant seated in a seat and which is operated at a collision between vehicles to be able to protect the lower limbs and is configured so that an expanded airbag is arranged in front of the lower limbs.

2. Related Art

There has been a conventional airbag apparatus enabled to protect the lower limbs of an occupant seated in a seat, for example, a knee protecting airbag apparatus enabled to appropriately protect the knees of an occupant seated in a seat by an airbag even when the occupant changes his anteroposterior arranged position (see, e.g., JP-A-2004-352037).

This airbag apparatus is configured so that the airbag and a device for expanding the airbag are fixed to arranged positions thereof, that a support member for supporting the expanded airbag is provided separately therefrom, and that even when the positions of the lower limbs of an occupant change backward and forward, the lower limbs of the occupant are protected by moving the support member itself so as to support the front side of the airbag and as to assure the cushioning effect of the airbag.

However, in the conventional lower limb protecting airbag apparatus, the expansion inflation completing position of the airbag is set according to a vehicle in which the airbag apparatus is mounted. In a case where the type of a vehicle is changed, or where the design of the surrounding member, for example, an instrument panel is changed, it is sometimes necessary to change the mounting positions of the airbag apparatus and the supporting member and the design of the expansion completing shape of the airbag. Consequently, the conventional lower limb protecting airbag apparatus cannot easily deal with the changes of the type of the vehicle, in which the airbag apparatus is mounted, and the design of the surrounding member.

SUMMARY OF THE INVENTION

The invention solves the aforementioned problems. An object of the invention is to provide a lower limb protecting airbag apparatus mounted in a vehicle, which is configured so that even when the type of the vehicle, in which the airbag apparatus is mounted, and the design of the surrounding member are changed, the airbag apparatus can easily deal with changes of the type of the vehicle and the design of the surrounding member.

According to the invention, there is provided a lower limb protecting airbag apparatus which is provided in front of lower limbs of an occupant seated in a seat and is operated at collision of vehicles to be able to protect the lower limbs of the occupant so that an airbag having inflated is disposed in front of the lower limbs. This lower limb protecting airbag apparatus features that an accommodating part configured to accommodate and hold the airbag is supported by a feeding unit, the feeding unit is configured to cause, when activated, to feed the accommodating part from a standby position to a working position at which the airbag is expanded and inflated, and the accommodating part has a support portion enabled to support a front surface side when the airbag having completed inflation at the working position catches the lower limbs.

In the lower limb protecting airbag apparatus according to the invention, when activated, the accommodating part is fed by the feeding unit from the stand by position to the working position. Subsequently, the airbag protrudes from the accommodating part and inflates to be able to protect the lower limbs of the occupant. Then, even when the airbag catches the lower limbs of the occupant, the airbag is supported by the support portion provided in the accommodating part. Thus, a cushioning effect is assured. Consequently, the airbag can adequately protect the lower limbs of the occupant.

The lower limb protecting airbag apparatus is configured so that the airbag having completed the inflation is supported by the support portion provided in the accommodating part which has been fed from the standby position to the predetermined working position. The airbag is not supported by a surrounding vehicular part mounted in the lower limb protecting airbag apparatus. Thus, even when the type of the vehicle, in which the lower limb protecting airbag apparatus is mounted, or the surrounding part, such as an instrument panel, is changed, the lower limb protecting airbag apparatus can easily deal with this change, without changing the shape of the airbag having completed the inflation, only by adjusting a direction, in which the accommodating part is fed by the feeding unit from the standby position to the predetermined working position, and a feeding distance. That is, an inflator for supplying an inflation gas, and the case for accommodating a folded airbag can be shared by standardizing the shape of the airbag, which has completed the inflation, into a certain one. Thus, even when the type of the vehicle, in which the lower limb protecting airbag apparatus is mounted, or the surrounding part, such as an instrument panel, is changed, the lower limb protecting airbag apparatus can easily deal with this change only by adjusting a feeding direction, in which the accommodating part is fed by the feeding unit from the standby position to the predetermined working position, and a feeding distance. Additionally, the adjustment of the feeding direction can easily be performed only by adjusting, for example, a mounting direction of the feeding unit. Further, the adjustment of the feeding distance can easily be performed by changing, in a case where power of a power source is converted into a feeding distance by utilizing a gear, the gear ratio thereof, alternatively, by increasing and decreasing, in a case where a piston cylinder mechanism is utilized, a quantity of liquid to be supplied into a cylinder to thereby adjust a piston stroke.

Therefore, even when the type of the vehicle or the design of the surrounding part is changed, the lower limb protecting airbag apparatus can easily deal with this change and can easily be mounted in the vehicle.

Further, the lower limb protecting airbag apparatus according to the invention is configured so that the airbag is inflated by feeding the accommodating part, which accommodates the airbag, from the standby position to the predetermined working position. Accordingly, an interior-side space can be increased by a feeding space from the standby position to the working position. Particularly, in a vehicle interior, room for a space in a lower-limb-side can be assured. Additionally, in a case where the accommodating part is fed to the working position when collision of vehicles is predicted, and where subsequently, the collision of vehicles can be avoided, the accommodating part is returned to the standby position, so that the accommodating part can be utilized again at the next activation of the apparatus. Also, the capacity of the airbag can be reduced by the feeding space. Thus, the apparatus can be configured so that the inflator for supplying the airbag, and the part accommodating the airbag can be configured to be compact.

Incidentally, the feeding unit is configured to be able to move, in a feeding operation, the accommodating part rearwardly and linearly. Alternatively, the feeding unit is configured to rotationally move, in a feeding operation, the accommodating part rearwardly in a direction around an axis of a turning shaft provided around the accommodating part so that a direction of the axis of the turning shaft is set to be along a lateral direction of the accommodating part. In a case where the feeding unit feeds the accommodating part rearwardly and linearly, it is useful to adjust the feeding distance by adjusting an anteroposterior feeding stroke. In a case where the feeding unit is configured to rotationally move the accommodating part rearwardly in a direction around an axis of a turning shaft, it is useful to adjust the feeding distance by adjusting, for example, an angle of rotation around the axis of the turning shaft.

Alternatively, the lower limb protecting airbag apparatus can be configured so that an operation of the feeding unit is controlled by a control unit, and that the control unit, to which a signal output from a position detecting sensor is input, can adjust a feeding distance corresponding to an arranged position of the lower limbs. With this configuration, even after the apparatus is mounted in the vehicle, the lower limbs can appropriately be protected by the airbag, which inflates at the adjusted working position, corresponding to the arranged position of the lower limbs, which are shifted in an anteroposterior direction.

DETAILED DESCRIPTION OF THE PREFERRED EMBODIMENTS

Figure 1:
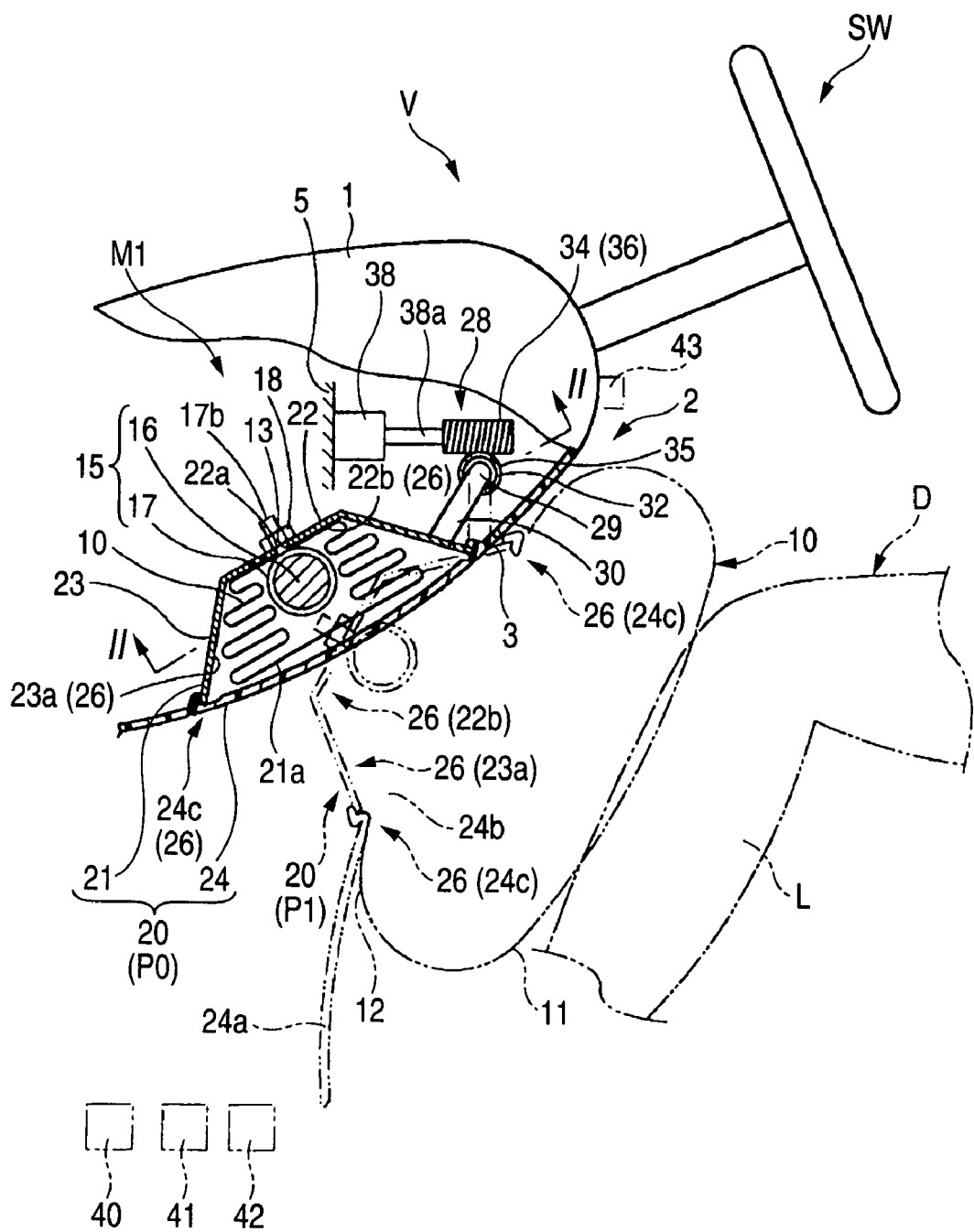
FIG. 1 is a schematic longitudinal cross-sectional view, taken in an anteroposterior direction, illustrating a state in which a lower limb protecting airbag apparatus according to a first embodiment of the invention is used.

Hereinafter, embodiments of the invention are described with reference to the accompanying drawings. As illustrated in FIG. 1, a lower limb protecting airbag apparatus M1 is to be used for a driver seat. Additionally, the lower limb protecting airbag apparatus M1 is mounted at a lower part 2 of an instrument panel (hereunder abbreviated as an in pane) in which a steering apparatus SW of the steer-by-wire type is mounted. Also, the lower limb protecting airbag apparatus M1 is disposed in front of the lower limbs L of an occupant (or driver) D seated in a driver seat.

The lower limb protecting airbag apparatus M1 includes an airbag 10, an inflator 15 for supplying inflation gas, a case 20 serving as an accommodating part which accommodates the folded airbag 10, a feeding unit 28 for feeding the case 20 serving as the accommodating part from a standby position P0 to a predetermined working position P1, and a control unit 40 for controlling operations of the inflator 15 and a servo motor 38 serving as a driving source for the feeding unit 28.

The control unit 40 is configured so that signals are input thereto from a collision predicting sensor 41, such as a millimeter wave radar, enabled to predict a collision of the vehicle V and a collision object, and a collision detecting sensor 42, such as an acceleration sensor, enabled to detect a deceleration of the vehicle V at an actual collision. When the control unit 40 predicts a collision of the vehicle V and the object according to the signal from the collision predicting sensor 41, the control unit 40 activates the servo motor 38. Further, when the control unit 40 detects a collision of the vehicle V and the object according to the signal from the collision detecting sensor 42, the control unit 40 activates the inflator 15. Incidentally, according to the embodiment, even in a case where no collision detection signal from the collision detecting sensor 42 even when a predetermined time has elapsed after the case 20 is fed from the standby position P0 to the working position P1 by activating the servo motor 38, the control unit 40 activates the servo motor 38 so as to return the case 20 to the standby position P0 before the servo motor 38 is activated.

Figure 3:
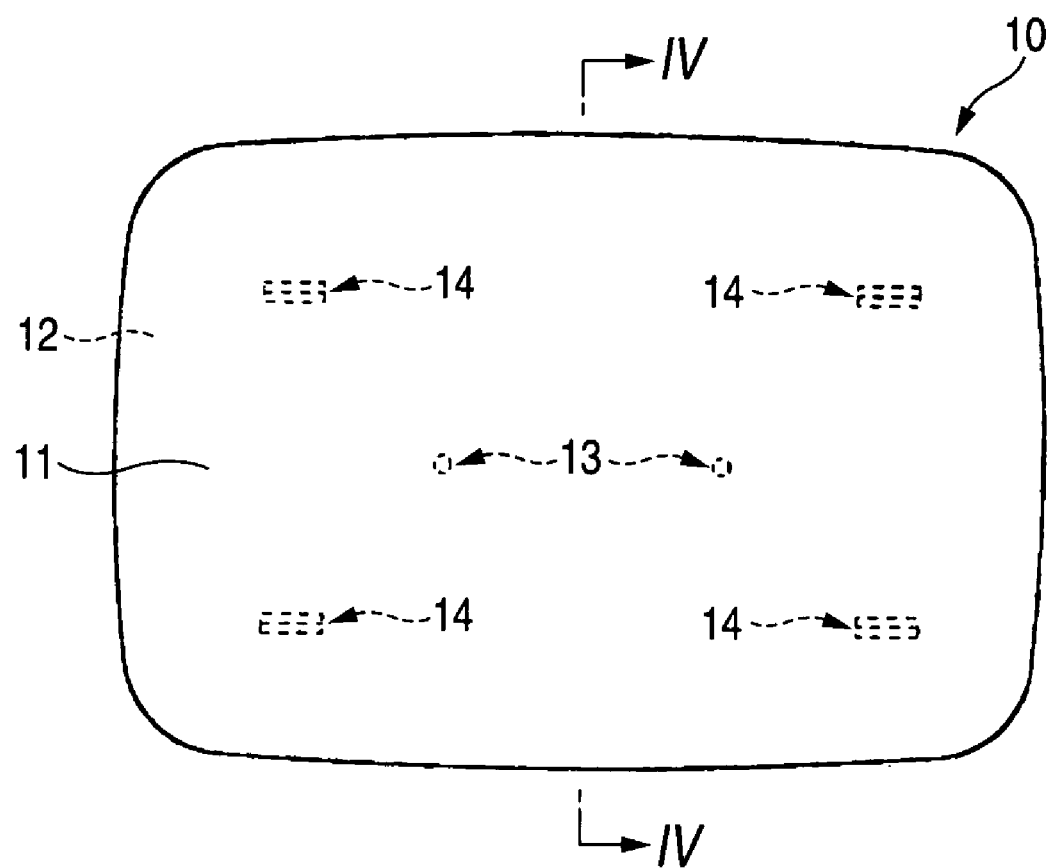
FIG. 3 is a front view illustrating an airbag used in the first embodiment.
Figure 4:
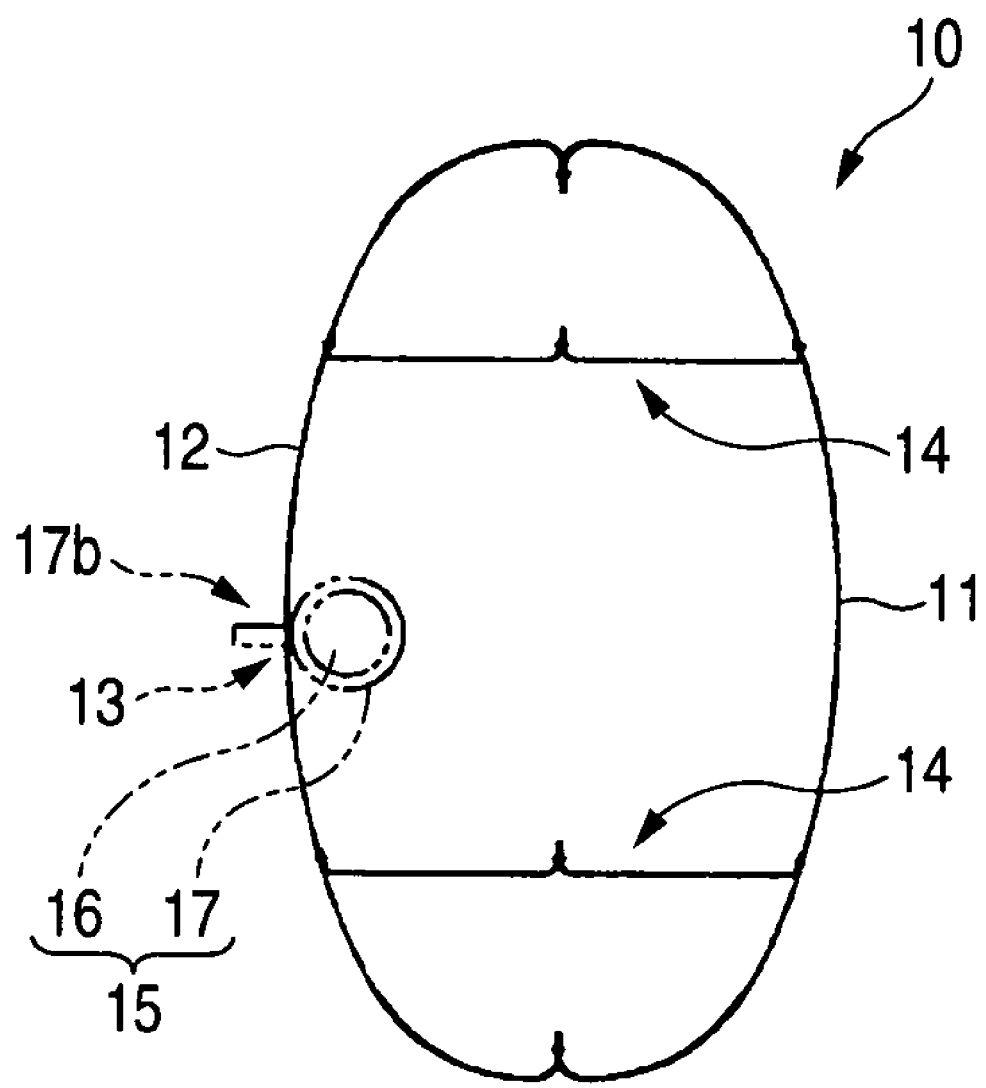
FIG. 4 is a longitudinal cross-sectional view, taken on line IV-IV shown in FIG. 3, illustrating the airbag used in the first embodiment.

As illustrated in FIGS. 3 and 4, the airbag 10 is configured so that the shape thereof at completion of the inflation is an oblong rectangle. The airbag 10 is formed like a bag by combining the outer circumferential edges of an occupant side wall portion 11 and a vehicle body side wall portion 12, which have the same rectangular shape, with each other. Two mounting holes 13 extending in parallel to the left-right direction are formed in the vicinity of a central part in up-down and left-right directions of the vehicle body side wall portion 12. A plurality of tethers 14, which regulate a thickness so that the plate-like shape can be maintained, are provided in the airbag 10 so as to connect the occupant side wall portion 11 and the vehicle body side wall portion 12 to each other.

Figure 2:
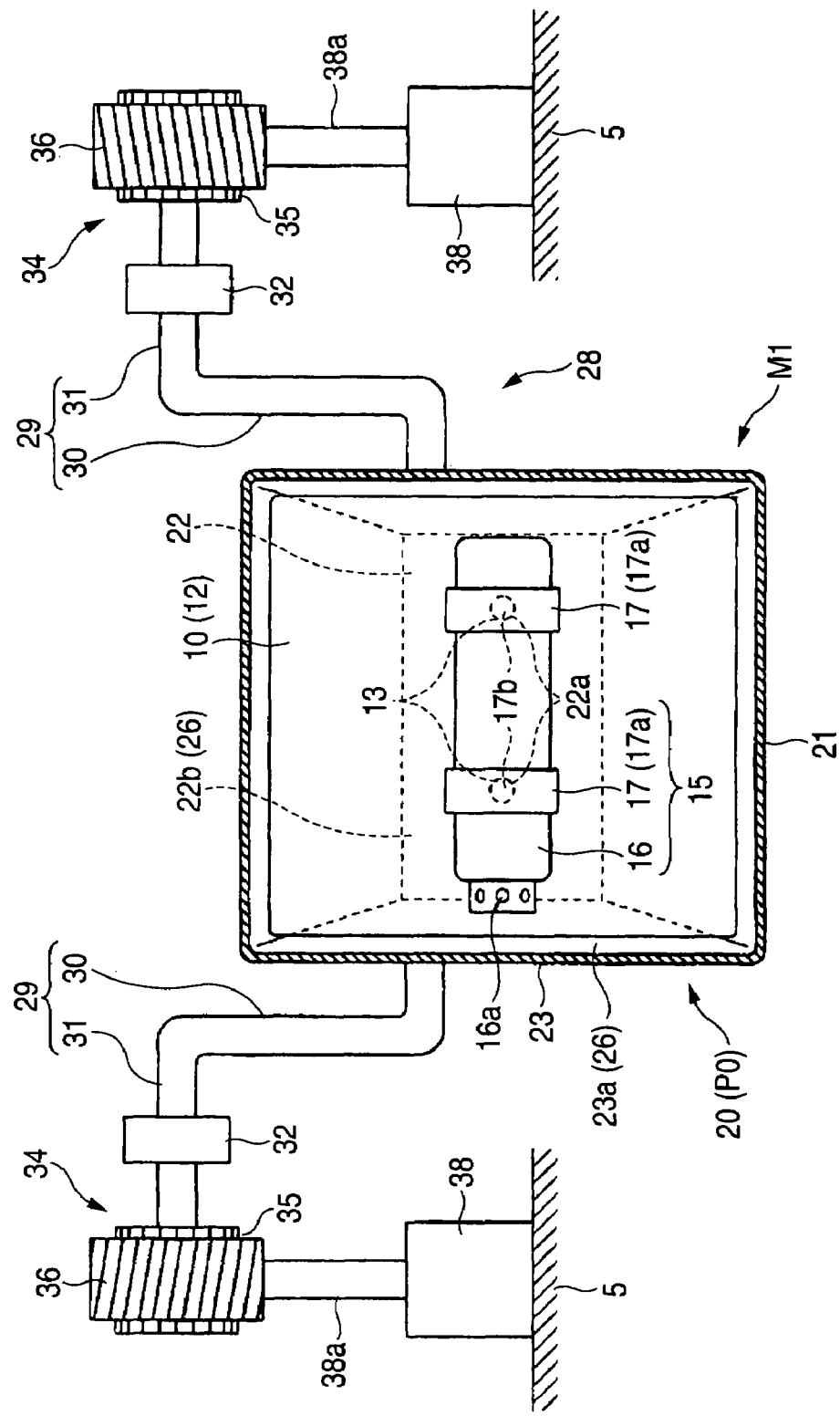
FIG. 2 is a schematic transversal cross-sectional view, taken on line II-II shown in FIG. 1, illustrating the lower limb protecting airbag apparatus according to the first embodiment

As illustrated in FIGS. 1 and 2, the inflator 15 is configured to have a substantially cylindrical body 16 and a mounting bracket 17 with which the body 16 is attached to the case 20. A plurality of gas discharging ports 16a, from which inflation gas is discharged when the inflator 16 is operated, are formed in the body 16. The mounting bracket 17 includes an annular holding portion 17a which sandwiches and holds the body 16, and a bolt 17b protruding from the holding portion 17a. This inflator 15 is inserted into the airbag 10 in a state in which the body 16 is held by the holding portion 17a. The bolt 17b is further protruded out of the case 20 from a through hole 22a in a state in which the bolt 17b is protruded out of the airbag 10 through the mounting hole 13. Thus, the inflator 15 is attached to the case 20 together with the airbag 10 by fastening the bolt to the nut 18.

As illustrated in FIGS. 1 and 2, the case 20 includes a box-like case body 21, and an airbag cover 24 which closes an opening 21a in the case body 21. The case body 21 is made of a sheet metal having stiffness and has a bottom wall 22, and a peripheral wall 23 extending like a square cylinder opened outwardly from an outer peripheral edge of the bottom wall 22. A through hole 22a, through which each bolt 17b of the inflator 15 is passed, is formed in the bottom wall 22. The airbag cover 24 is attached to the circumferential edge of the peripheral wall 23 and is made of a synthetic resin, similarly to the surrounding inpane 1. The airbag cover 24 has a door portion 24a which is downwardly opened by being pushed by the airbag 10 which is inflated. In a state in which the case 20 is placed at the standby position P0, the airbag cover 24 is placed so as to be accommodated in an opening 3 formed in the inpane 1 and to be flush with the peripheral edge of the opening 3.

In the case 20, a support portion 26 is formed so that when the airbag 10 expands and inflates at the working position P1 (see a part indicated by double-dashed chain lines shown in FIG. 1 and FIGS. 5B and 5C), the support portion 26 touches a vehicle body side wall portion 12 of the airbag 10 and supports the airbag 10 by regulating the forward displacement of the airbag 10. In the case of the present embodiment, the support portion 26 includes a rear surface 22b of the bottom wall 22, an inner circumferential surface 23a of the tapered peripheral surface 23 which becomes wider toward the opening 21a, and a peripheral edge 24c of the opening 24b opened in the door portion 24a of the airbag cover 24.

As illustrated in FIGS. 1 and 2, the feeding unit 28 includes a support arm 29 which supports the case 20, a gear mechanism 34, and the servo motor 38 serving as a driving source. Incidentally, the support arm 29, the gear mechanism 34, and the servo motor 38 are provided at each of both lateral sides of the case 20. Each of the support arms 29 has a connecting rod 30 whose bottom end is connected and fixed to an associated one of both lateral side parts of the peripheral walls 23 of the case body 21, and a turning shaft 31 extending outwardly from the top end of the connecting rod 30 in an associated one of left and right directions away from the case body 21. The turning shaft 31 is arranged so that an axial direction thereof is along an associated one of the left and right directions. The turning shaft 31 is turnably supported by an axis support portion 32 fixed to the body 5 of the vehicle V. Each of the gear mechanisms 34 includes a worm wheel 35 provided on the turning shaft 31, and a worm 36 which is fixed to a turning drive shaft 38a of the servo motor 38 and meshes with the worm wheel 35. Each of the servo motors 38, whose operation is controlled by the control unit 4, is fixed to the body 5 to be able to perform a forward rotation and a reverse rotation.

The working position P1 of the case 20, at which the airbag 10 expands and inflates, is set to be an optimum position of the airbag 10 which completes expansion and inflation and catches the lower limb L of a driver D seated in an ordinary place in the vehicle V, in which a lower limb protecting airbag apparatus M1 is mounted, corresponding to the shape of the airbag 10 at the completion of expansion and inflation.

Figure 5A:
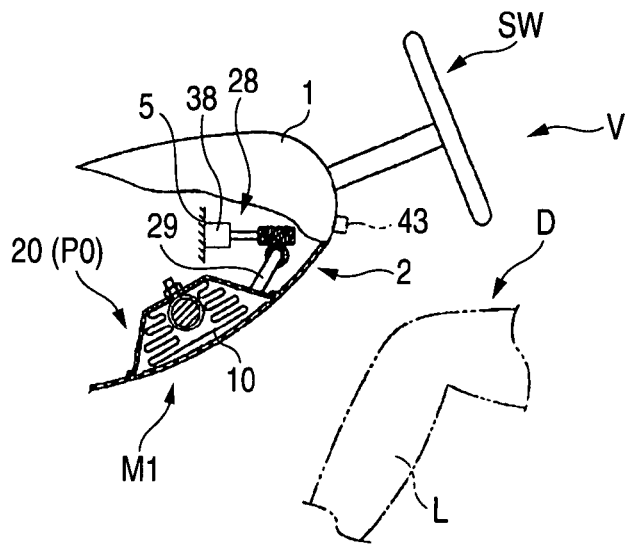
FIGS. 5A to 5C are views illustrating operations of the lower limb protecting airbag apparatus according to the first embodiment in sequence.
Figure 5B:
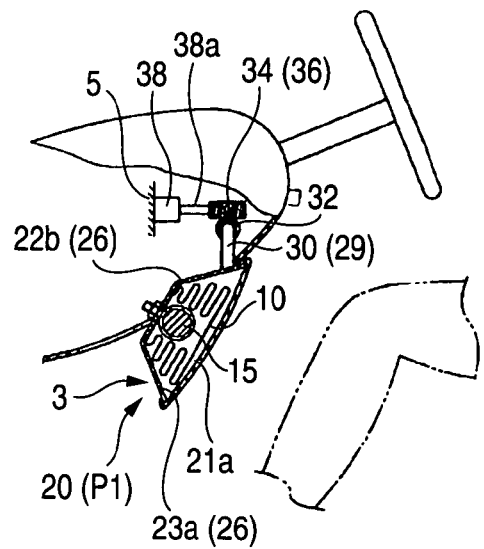
Figure 5C:
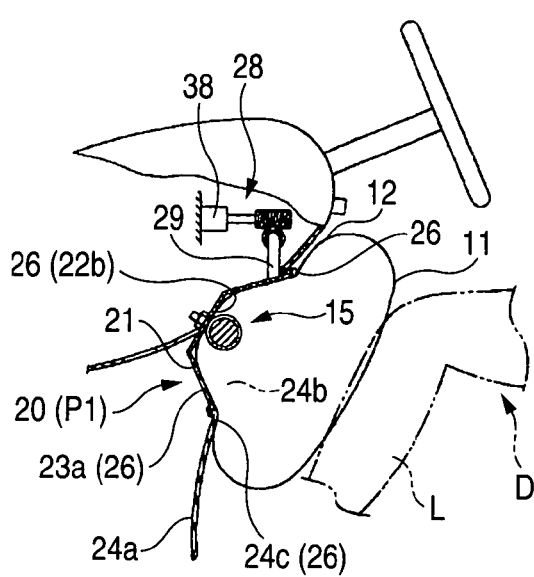
Figure 6:
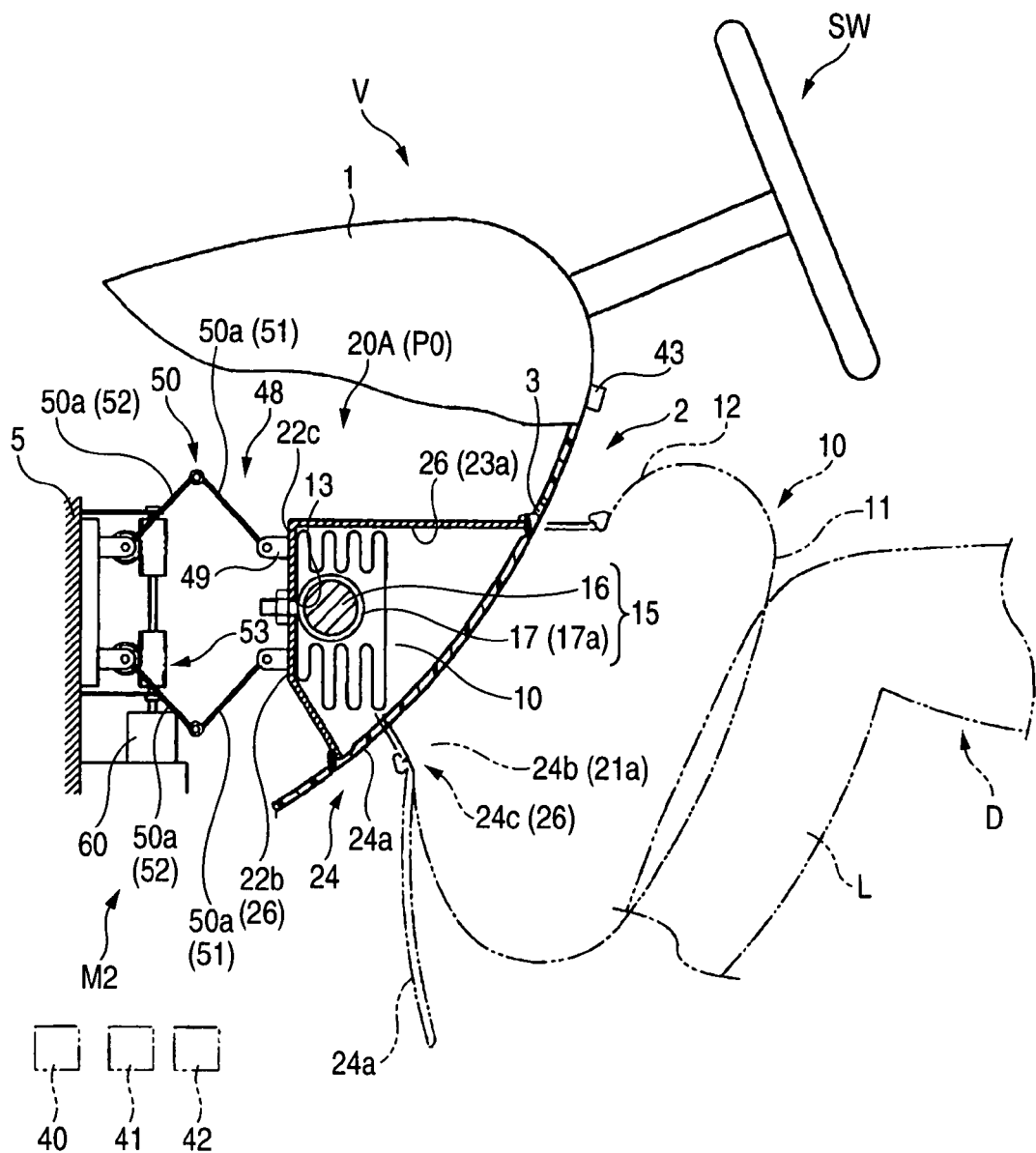
FIG. 6 is a schematic longitudinal cross-sectional view illustrating a lower limb protecting airbag apparatus according to a second embodiment.
Figure 7:
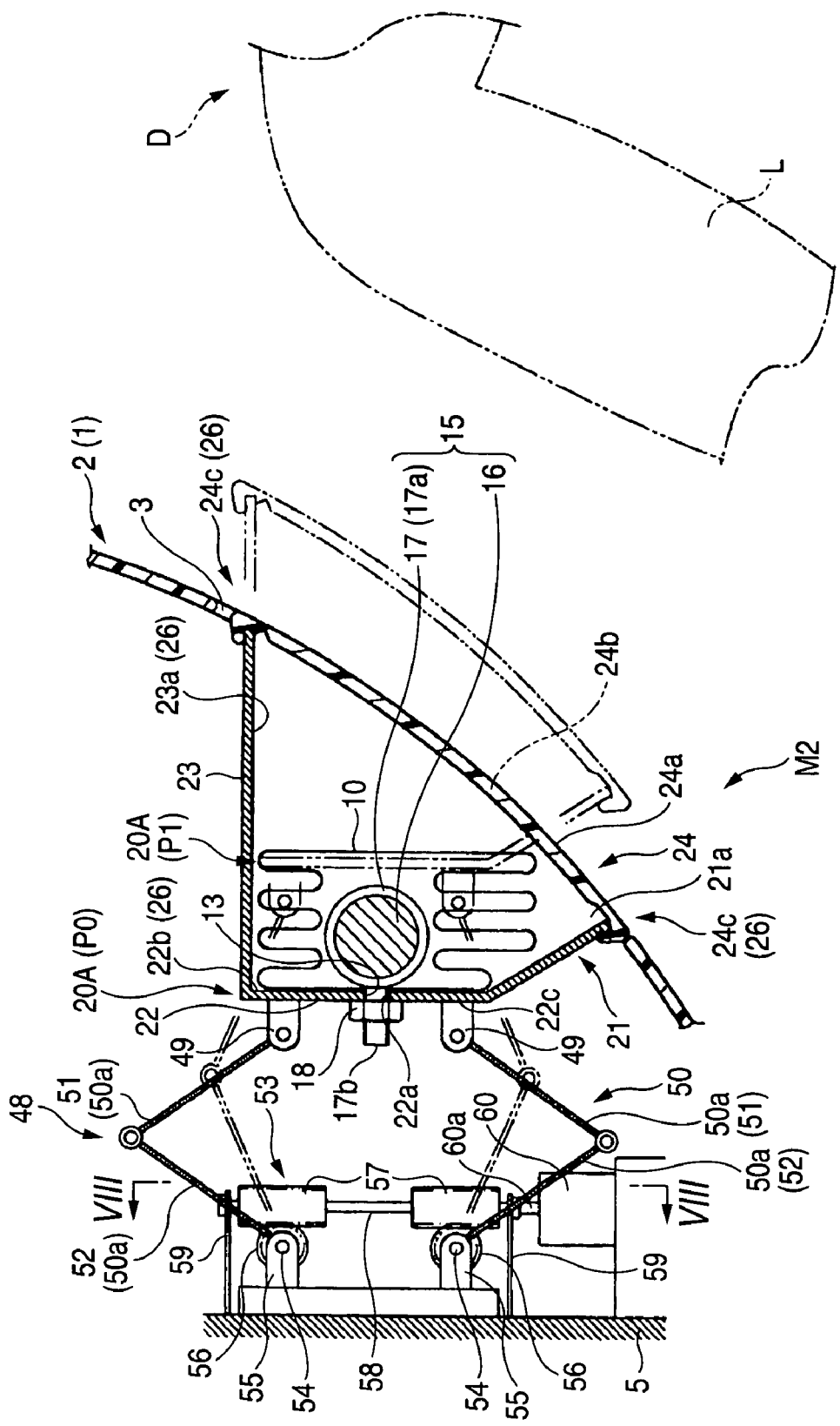
FIG. 7 is an enlarged longitudinal cross-sectional view illustrating a feeding unit according to the second embodiment.
Figure 8:
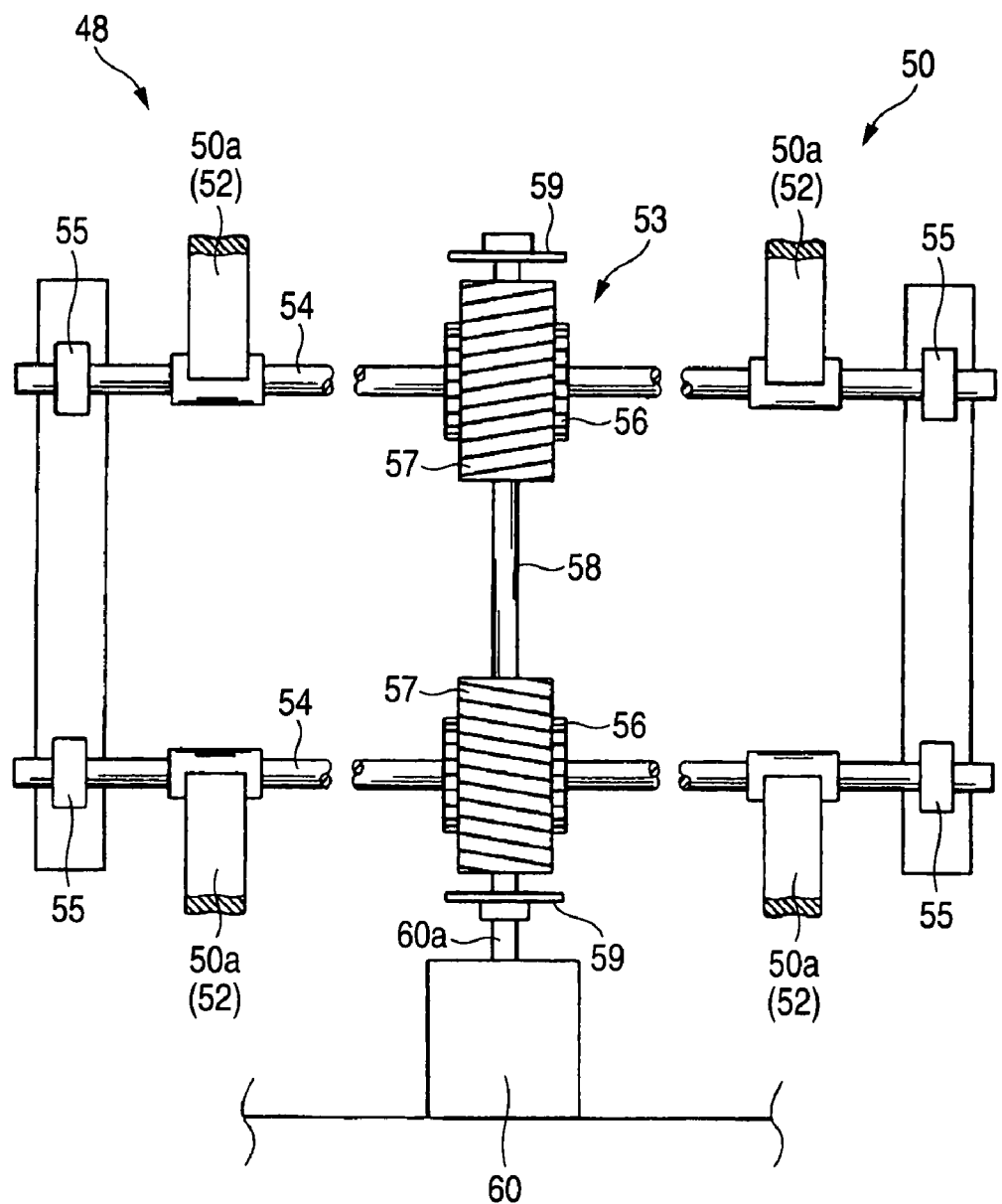
FIG. 8 is an enlarged longitudinal cross-sectional view, taken on line VIII-VIIII shown in FIG. 7, illustrating the feeding unit according to the second embodiment.

In the lower limb protecting airbag apparatus M1 according to the first embodiment of the invention, when the control unit 40 predicts, according to a signal from the collision predicting sensor 41, a collision of the vehicle V and an object to be collided, the servo motors 38, 38 are activated. Subsequently, when each of the left and right servomotors 38 causes the turning drive shaft 38a to perform forward rotation, the support arm 29 causes the bottom end of the connecting rod 30, through the gear mechanism 34, to rearwardly turn by a predetermined angle in a direction around the axis of the turning shaft 31. Thus, as shown in FIGS. 5A and 5B, the case 20 is rearwardly and rotationally moved to the working position P1 by employing the turning shaft 31 as the center of rotation. Also, when the control unit 40 detects the collision of the vehicle V and the object according to a signal from the collision detecting sensor 42, the inflator 15 is activated. Thus, as shown in FIG. 5A to 5C, the airbag 10 is inflated by the inflation gas output from the inflator 15, so that the door portion 24a of the airbag cover 24 is pushed and opened, and that the airbag 10 protrudes from the case body 21. Thus, the inflation of the airbag 10 is completed. Even when the airbag 10 catches the lower limb L and moves frontwardly, the airbag 10 is supported by the support portion 26 provided in the case 20. Consequently, cushioning effects are assured. The airbag 10 can appropriately protect the lower limb L.

In the lower limb protecting airbag apparatus M1 according to the first embodiment, the airbag 10 having completed the inflation is supported by the support portion 26 provided in the case 20 fed to the predetermined working position P1 from the standby position P0. That is, the airbag 10 is not supported by the surrounding component, such as the inpane 1 of the vehicle V in which the lower limb protecting airbag apparatus M1 is mounted. Thus, even when the type of the vehicle or the design of the surrounding components, such as the inpane 1, is changed, the lower limb protecting airbag apparatus M1 can easily deal with such change only by adjusting a direction, in which the case 20 is fed from the standby position P0 to the working position P1 by the feeding unit 28, and a feeding distance. That is, in the case of standardizing the shape of the airbag 10 having completed the inflation into a certain shape, the inflator 15 for supplying the inflation gas, and the case body 21 of the case 20, which accommodates the folded airbag 10, can be shared. Even when the type of the vehicle, on which the airbag apparatus is mounted, and the design of the surrounding part, such as the inpane 1, are changed, the airbag apparatus M1 can easily deal with such change only by adjusting a feeding direction, in which the case 20 is fed from the standby position P0 to the working position P1 by the feeding unit 28, and a feeding amount. Additionally, the adjustment of the feeding direction can easily be performed only by adjusting, for example, a mounting angle of the connecting rod 30 in the support arm 29 of the feeding unit 28. Also, the adjustment of an angle of rotation of the connecting rod 30 of the first embodiment as the feeding amount can easily be performed by changing, for example, in a case where the angle of rotation of the rod 30 is converted into the feeding amount, the diameter of the worm wheel 35 to a small-diameter worm wheel or changing the number of revolutions of the turning drive shaft 38a.

Therefore, even when the type of the vehicle and the design of the surrounding part, the lower limb protecting airbag apparatus M1 of the first embodiment can easily deal with such change and can easily be mounted in the vehicle.

Because the lower limb protecting airbag apparatus M1 of the first embodiment is configured so that the case 20 serving as the accommodating part, in which the airbag 10 is accommodated, is fed from the standby position P0 to the predetermined working position P1 to inflate the airbag 10, an interior-side space can be increased for a feeding space from the standby position P0 to the working position P1. Particularly, room for the space, in which the lower limbs L are accommodated, can be assured in the vehicle interior.

Additionally, in the lower limb protecting airbag apparatus M1 of the first embodiment, the control unit 40, to which a signal from the collision predicting sensor 41 is input, activates the servo motors 60 of the feeding unit 48 when the collision of the vehicle V and an object is detected. As shown in FIGS. 5A and 5B, the case 20A is fed to the working position P1. Thereafter, in a case where the collision of the vehicle V and the object is prevented, the servo motors 60 are operated to return the case 20A to the standby position P0 by performing the operations shown in FIGS. 5B and 5A in this order. Consequently, the case 20A can be utilized again when the airbag is operated the next time.

Furthermore, in the lower limb protecting airbag apparatus M1 according to the first embodiment, the capacity of the airbag itself 10 can be reduced by the feeding space required to feed the case 20. The case body 21, in which the inflator 15 for supplying the inflation gas to the airbag 10 and the airbag 10 are accommodated, can be compacted.

In addition to the rotational displacement of the case 20, the feeding unit can be adapted to rearwardly and linearly feed a case 20A, in a lower limb protecting airbag apparatus M2 according to a second embodiment of the invention, which is described below and illustrated in FIGS. 6 to 9C. The second embodiment is configured so that a feeding unit 48 is adapted to move the case 20A linearly and backwardly, that the control unit 40 is provided in the inpane 1 placed in front of a driver seat and that a signal output from a position detecting sensor 43 constituted by a CCD camera for detecting the anteroposterior position of the lower limbs L of a driver D is input to the control unit 40. In the second embodiment, a signal output from the position detecting sensor 43 is input to the control unit 40 when the feeding unit 48 is activated. Then, the feeding distance of the case 20A is adjusted according to the arrangement position of the lower limbs L. Incidentally, the second embodiment is similar to the first embodiment in components, such as the airbag 10, the inflator 15, and the support portion 26 for the airbag 10, except that the feeding unit 48 is configured as described above, that the case 20A is placed so that the bottom wall 22 thereof is set to perpendicularly intersect with an upper wall surface of the peripheral wall 23 and to extend along a vertical direction, and that the position detecting sensor 43 is adapted as described above. Parts and members of the second embodiment, which are similar to those of the first embodiment, are designated by the same reference numerals. Thus, the description of such parts and members is omitted.

The feeding unit 48 of the second embodiment includes a link mechanism 50, a gear mechanism 53, and a servo motor serving as a driving source, and is held by the body 5. The link mechanism 50 is of the pantograph type including eight links 50a. The link mechanism has four rear links 51 serving as the rear-side links 50a axially supported by an axis support portion 49 provided in a front face 22c of the bottom wall 22, and front links 52 serving as the link 50a turnably attached to the rear links 51, respectively. The front links 52, two of which face the remaining two front links, are fixed to the turning shaft 54 provided in a lateral direction. The gear mechanism 53 includes two turning shafts 54 arranged in an up-down direction, worm wheels respectively fixed to the turning shafts 54, worms 57 respectively meshing with the worm wheels 56, and a single turning shaft, and a turning shaft 58 to which each of the worms 57 is fixed. The upper and lower worm wheels 56 and the upper and lower worms 57 are configured so that tooth grooves extend in opposite directions. The two or upper and lower turning shafts 54, to which the front links 52 are respectively fixed, extending in a lateral direction are supported at both lateral ends thereof by a bearing 55. The single turning shaft 58, to which the upper and lower worms 57 are fixed, extend in an up-down direction and is supported at both the upper and lower ends thereof by a bearing 59 and is connected to the turning drive shaft 60a of the servo motor 60. The servo motor 60 is enabled to perform the forward rotation and the reverse rotation of the turning drive shaft 60a. An operation of the servo motor 60 is controlled by the control unit 40. That is, when the control unit 40 receives a signal from the collision predicting sensor 41 and predicts the collision of the vehicle V and an object to be collided, and detects the anteroposterior position of the lower limb L of the driver D according to a signal from the position detecting sensor 43, the control unit 40 activates the servo motor 60 to cause the turning drive shaft 60a to perform forward rotations.

Figure 9A:
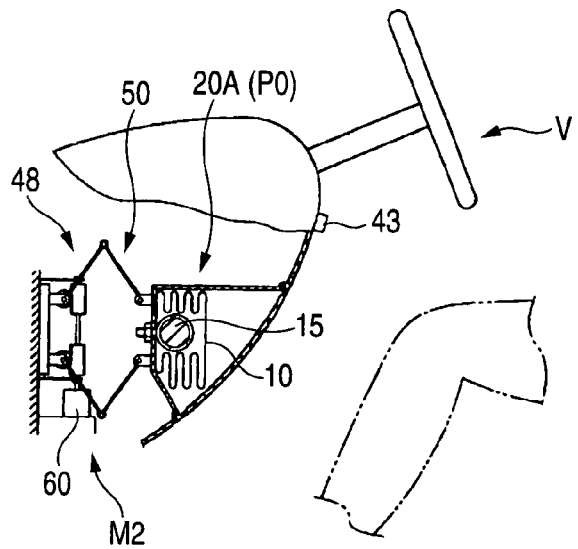
FIGS. 9A to 9C are views illustrating operations of the lower limb protecting airbag apparatus according to the second embodiment in sequence.
Figure 9B:
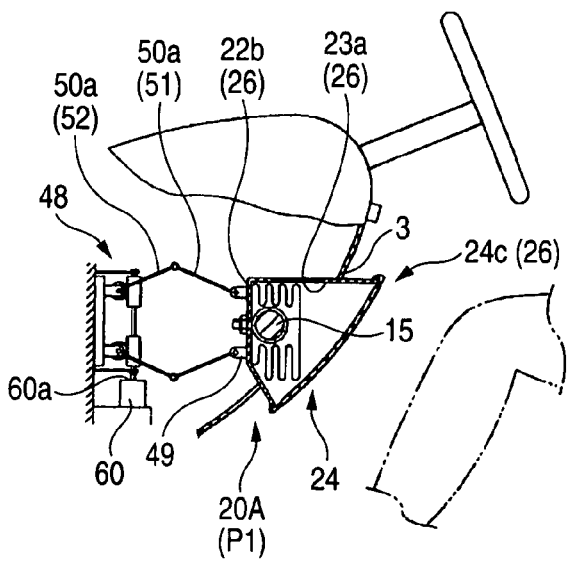

When the turning drive shaft 60a of the servo motor 60 performs forward rotations, the turning shaft 58 connected to the turning drive shaft 60a performs forward rotations. Each of the upper and lower worms 57 connected to the turning shaft 58 performs forward rotations to thereby cause the worm wheels 56 with which the worms 57 mesh. When each of the worm wheels 56 performs forward rotations, the turning shafts 54 performs forward rotations so as to straight extend each of the rear links 51 and an associated one of the front links 52, which are attached to each other. Each of the turning shafts 4 performs rotation forward to cause the front link 52 to perform forward rotations. Consequently, as shown in FIGS. 9A and 9B, the case 20A is fed from the standby position P0 to the working position P1 by setting the distance between the positions P0 and P1 as a feeding amount corresponding to the arrangement position of the lower limb L.

Even in the case of the second embodiment, the working position P1 of the case 20A, in which the airbag 10 expands and inflates, is set to be as a reference position serving as an optimum position at which the airbag 10 having completed expansion and inflation catches the lower limb L of the driver D seated at an ordinary position in the vehicle V, in which the lower limb protecting airbag apparatus M2 is mounted, corresponding to the shape of the airbag 10 having completed the expansion and the inflation. In the second embodiment, the control unit 40 adjusts the feeding distance corresponding to the arrangement position of the lower limbs L from the reference position according to a signal from the position detecting sensor 43. Thus, a place corresponding to the working position P1 is adjusted.

Figure 9C:
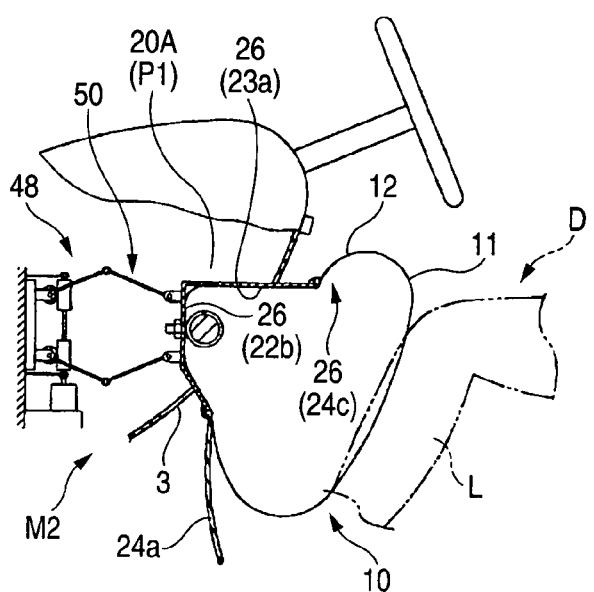

In a case where after the case 20A is placed at the working position P1, the control unit 40 detects the collision of the vehicle V and an object according to a signal sent from the collision detecting sensor 42, the inflator 15 is activated. Thus, as shown in FIG. 9C, the airbag 10 inflates due to the inflation gas sent from the inflator 15 and pushes and opens the door portion 24a of the airbag cover 24, so that the air bag protrudes there from and completes the inflation. Even when the airbag 10 catches the lower limb L and frontwardly moves, the airbag 10 is supported by the support portion 26 provided in the case 20A. Consequently, the cushioning effect is assured. Accordingly, the airbag 10 can appropriately the lower limb 1.

In the lower limb protecting airbag apparatus M2 according to the second embodiment, the airbag 10 having completed the inflation is supported by the support portion 26 provided in the case 20A fed to the predetermined working position P1 from the standby position P0. That is, the airbag 10 is not supported by the surrounding component, such as the inpane 1 of the vehicle V in which the lower limb protecting airbag apparatus M2 is mounted. Thus, even when the type of the vehicle or the design of the surrounding components, such as the inpane 1, is changed, the lower limb protecting airbag apparatus M2 can easily deal with such change only by adjusting a direction, in which the case 20 is fed from the standby position P0 to the working position P1 by the feeding unit 28, and a feeding distance. That is, in the case of standardizing the shape of the airbag 10 having completed the inflation into a certain shape, the inflator 15 for supplying the inflation gas, and the case body 21 of the case 20A, which accommodates the folded airbag 10, can be shared. Even when the type of the vehicle, on which the airbag apparatus is mounted, and the design of the surrounding part, such as the inpane 1, are changed, the airbag apparatus M2 can easily deal with such change only by adjusting a feeding direction, in which the case 20A is fed from the standby position P0 to the working position P1 by the feeding unit 28, and a feeding amount. Additionally, the adjustment of the feeding direction can easily be performed only by adjusting, for example, a mounting angle of each of the servo motor 60 and a bearing 59 in the feeding unit 48. Also, the adjustment of the feeding amount can easily be performed by changing the number of revolutions of the turning drive shaft 60a of the servo motor 60.

Accordingly, even when the type of the vehicle, on which the airbag apparatus is mounted, or the design of the surrounding part is changed, the lower limb protecting airbag apparatus M2 according to the second embodiment can easily deal with such changes and can easily be mounted in the vehicle. Consequently, the second embodiment can obtain advantages similar to those of the first embodiment.

Apparently, even in the case of the second embodiment, the control unit 40, to which a signal from the collision predicting sensor 41 is inputs activates the servo motors 60 of the feeding unit 48 when the collision of the vehicle V and an object is predicted. As shown in FIGS. 9A and 9B, the case 20 is fed to the working position P1. Thereafter, in a case where the collision of the vehicle V and the object is prevented, the servo motors 38 are operated to return the case 20 to the standby position P0 by performing the operations shown in FIGS. 9B and 9A in this order. Consequently, the case 20 can be utilized again when the airbag is operated the next time.

Figure 10A:
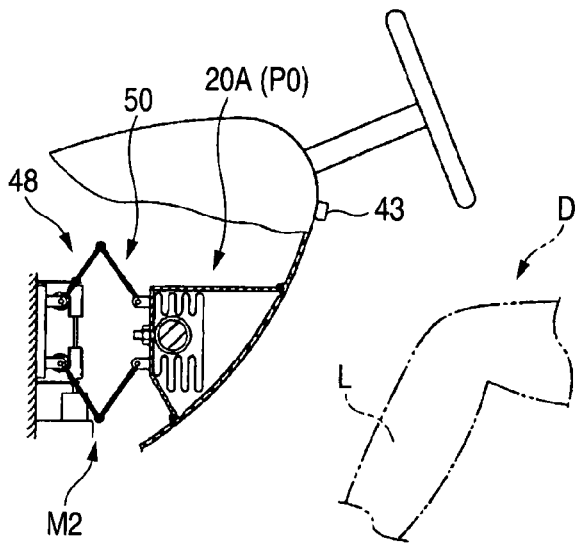
FIGS. 10A to 10C are views illustrating operations of the second embodiment in a case where the arrangement position of the lower limb changes.
Figure 10B:
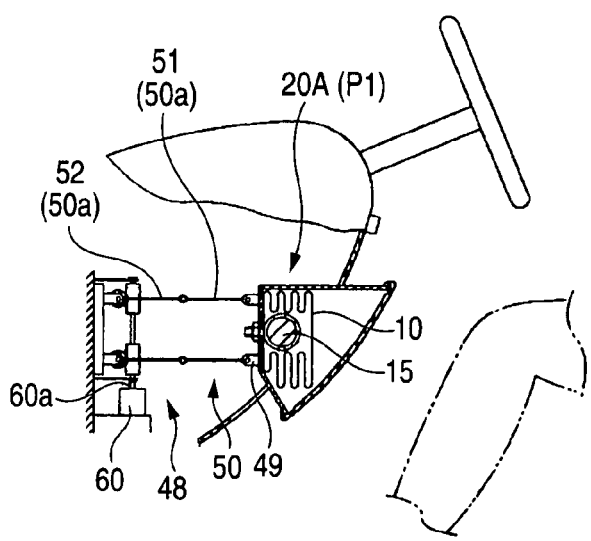
Figure 10C:
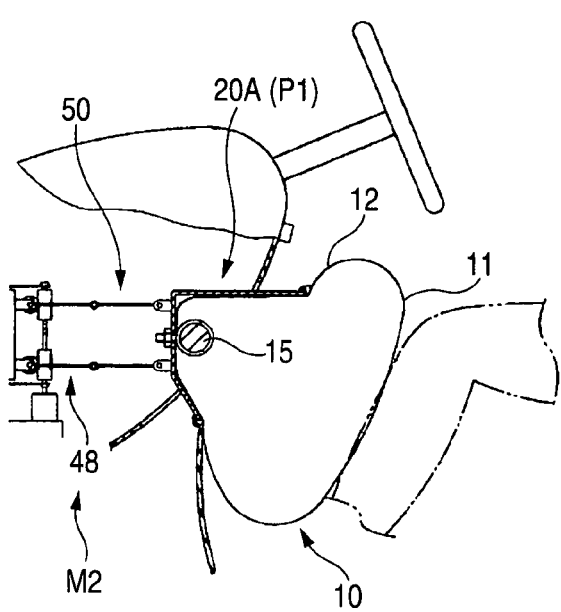

Additionally, in the second embodiment, the control unit 40, to which a signal from the position detecting sensor 43 enabled to detect the arrangement position of the lower limb L is input, can adjust the feeding distance corresponding to the arrangement position of the lower limb L. Thus, in a case where as illustrated in FIGS. 10A to 10C, the lower limb L is placed at a more backward position than the position illustrated in FIGS. 9A to 9C, the anteroposterior length of the link mechanism 50 is increased, so that each of the rear links 51 and an associated one of the front links 52 are arranged linearly, as shown in FIGS. 10A and 10B, by increasing the number of revolutions of the servo motor 60 in the case of forward rotations, by a predetermined value, corresponding to the arrangement position of the lower limb L. Thus, the case 20A can be placed at amore backward position than a position shown in FIG. 9B. Thereafter, when the inflator 15 is activated, the lower limb L placed at a backward position can appropriately be protected, as shown in FIG. 10C.

Figure 11A:
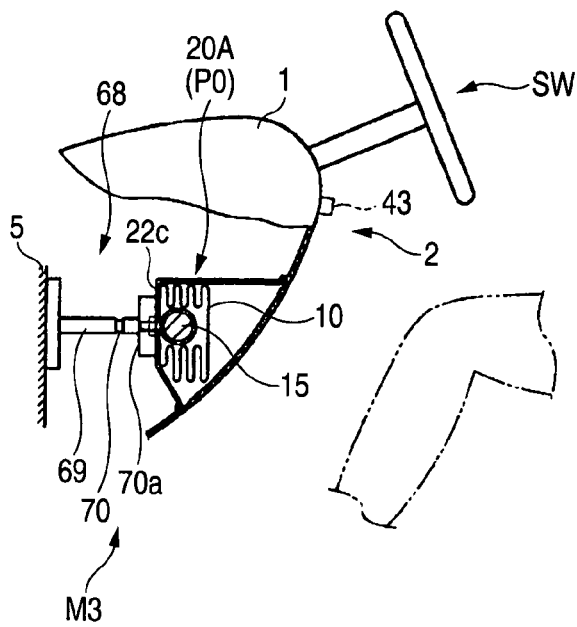
FIGS. 11A to 11C are views illustrating operations of a lower limb protecting airbag apparatus according to a third embodiment.
Figure 11B:
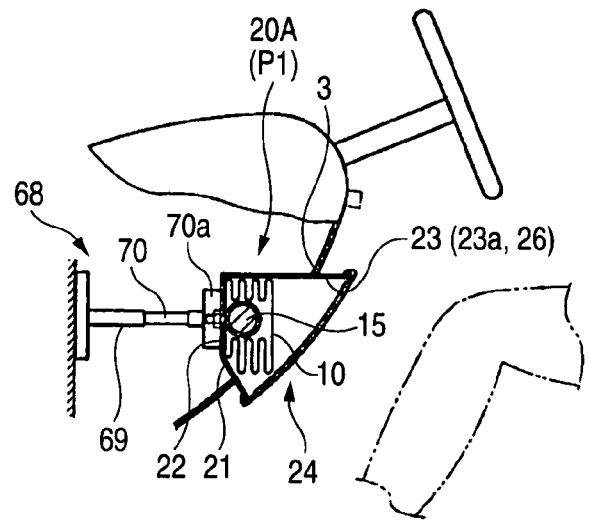
Figure 11C:
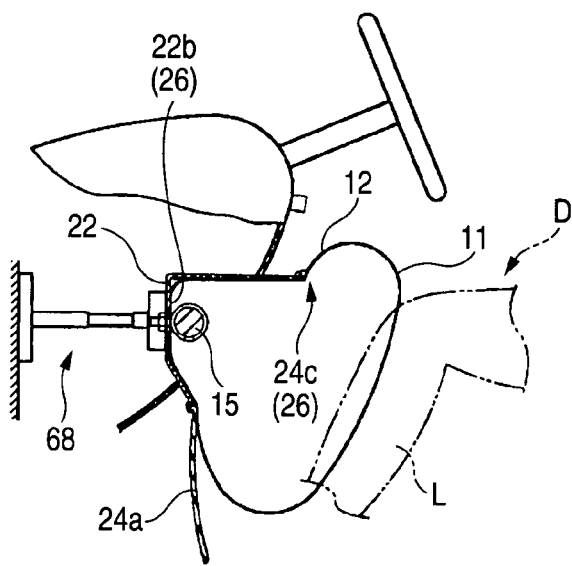

Incidentally, in addition to the use of the link mechanism 50, the feeding unit can be constituted by a cylinder 69, which has a piston 70 rearwardly moved by being enabled to perform reciprocating linear movement and utilizes a hydraulic pressure or an air pressure, similarly to a lower limb protecting airbag apparatus M3 and a feeding unit 68 according to a third embodiment illustrated in FIGS. 11A to 11C. Additionally, two cylinders 69 are provided at the side of the front surface 22c of the bottom wall 22 of the case 20A. A rear end 70a of each of the pistons 70 is connected to apart in the vicinity of an associated one of both lateral edges. An operation of each of the cylinders 69 is controlled by the control unit 40. An operating time of each of the cylinders 69 is similar to those of the servo motor 38 of the first embodiment and the servo motor 60 of the second embodiment. The third embodiment can obtain advantages similar to those of the first and second embodiments.

The first and third embodiments can be configured so that the position detecting sensor 43 enabled to detect the arrangement position of the lower limb L is provided (see parts indicated by double-dashed chain lines shown in FIGS. 1, 5A to 5C, and 11A to 11C), that the control unit 40 adjust the number of revolutions of the turning drive shaft 38a of the servo motor 38 and the stroke of the piston 70 according to the arrangement position of the lower limb L in response to a signal from the position detecting sensor 43 so as to adjust the working position P1 of the case 20, 20A.

Although the airbag apparatuses for a driver seat has been described as an example, the lower limb protecting airbag apparatus according to the invention can be utilized at an assistant driver's seat.

A sensor configured to detect the arrangement position of a seat, in which a driver or the like is seated, can be utilized as a position detecting sensor enabled to detect the arrangement position of the lower limb L.

In addition to the servo motors utilized in the first to third embodiments, a microgas generator and an actuator for a motor utilizing a hydraulic or an air pressure can be utilized as a driving source for the feeding unit. In such a case, it is sufficient to complete the movement of the case before the inflator 15 is activated. Thus, it is unnecessary for the feeding unit to quickly complete an operation thereof, differently from the airbag 10 that quickly complete an operation.

In the foregoing description of each of the embodiments, it has been described by way of an example that the rear surface 22b of the bottom wall 22 of the case 20 or 20A, the inner circumferential surface 23a of the peripheral wall 23, and the peripheral edge 24c of the opening 24b of the airbag cover 24 have been used as the support portion 26 for supporting the airbag 10 having completed expansion and inflation. However, in addition to the support portion 26, at least a part of the airbag 10 having completed the inflation can be supported by a support member, such as a support plate, which is separated from the case 20 and is fed similarly to the case 20, or can be supported by a part, such as the inpane 1, which is placed around the fed case 20 or 20A.

What is claimed is:

1. A lower limb protecting airbag apparatus which is provided in front of lower limbs of an occupant seated in a seat and is operated at collision of vehicles to be able to protect said lower limbs of said occupant so that an airbag having inflated is disposed in front of said lower limbs, said lower limb protecting airbag apparatus, wherein an accommodating part configured to accommodate and hold said airbag is supported by a feeding unit;

said feeding unit is configured to cause, when activated, to feed said accommodating part from a standby position to a working position at which said airbag is expanded and inflated;

said accommodating part has a support portion enabled to support a front surface side when said airbag having completed inflation at the working position catches said lower limbs an operation of said feeding unit is controlled by a control unit; and said control unit, to which a signal output from a position detecting sensor is input, can adjust a feeding distance corresponding to an arrangement position of said lower limbs, wherein, in a feeding operation, said feeding unit is configured to rotate said accommodating part in a rearward direction about an axis of a turning shaft, and wherein the axis of said turning shaft extends in a lateral direction of said accommodating part.

2. A lower limb protecting airbag apparatus comprising:

an airbag;

a feeding unit;

an accommodating part, which is supported by the feeding unit and accommodates and holds the airbag;

a position detecting sensor for detecting a passenger lower limb location; and a control unit, wherein the feeding unit moves the accommodating part from a standby position to a working position at which the airbag is expanded and inflated, the accommodating part has a support portion, which supports a front surface of the airbag when the airbag is fully inflated at the working position and when the airbag has engaged lower limbs of a passenger, when the airbag apparatus is operated, the accommodating part is moved by a moving distance in a rearward direction toward the lower limb location to a position in front of the passenger lower limb location, the airbag apparatus is operated when a vehicle in which the airbag apparatus is installed collides with an object to protect the lower limbs of the passenger so that the airbag, when inflated, is positioned in front of the passenger lower limb location, movement of the feeding unit is controlled by the control unit; and the control unit, which receives a signal from the position detecting sensor, adjusts the moving distance in accordance with the passenger lower limb location, wherein the feeding unit pivots the accommodating part about a pivot axis, and the pivot axis extends in a lateral direction of the accommodating part.

* * * * *